(12) United States Patent
Kazenas

(10) Patent No.: US 8,027,853 B1
(45) Date of Patent: Sep. 27, 2011

(54) SYSTEMS AND METHODS FOR SELF-SERVICE VEHICLE RISK ADJUSTMENT

(75) Inventor: Joseph Alfred Kazenas, Boerne, TX (US)

(73) Assignee: United States Automobile Associates (USAA), San Antonio, TX (US)

( * ) Notice: Subject to any disclaimer, the term of this patent is extended or adjusted under 35 U.S.C. 154(b) by 321 days.

(21) Appl. No.: 12/256,600

(22) Filed: Oct. 23, 2008

(51) Int. Cl.
*G06Q 40/00* (2006.01)
(52) U.S. Cl. .............................. 705/4; 705/35
(58) Field of Classification Search ........... 705/4
See application file for complete search history.

(56) References Cited

U.S. PATENT DOCUMENTS

| | | | |
|---|---|---|---|
| 7,844,477 B2 | 11/2010 | Bonissone et al. | |
| 7,865,378 B2 | 1/2011 | Gay | |
| 7,895,062 B2 | 2/2011 | Bonissone et al. | |
| 7,899,688 B2 | 3/2011 | Bonissone et al. | |
| 7,937,278 B1 | 5/2011 | Cripe et al. | |
| 2002/0042770 A1 | 4/2002 | Slyke et al. | |
| 2003/0167191 A1 | 9/2003 | Slabonik et al. | |
| 2006/0095301 A1* | 5/2006 | Gay | 705/4 |
| 2007/0255601 A1* | 11/2007 | Heydon et al. | 705/4 |
| 2008/0065427 A1 | 3/2008 | Helitzer et al. | |
| 2008/0133430 A1 | 6/2008 | Horowitz | |

OTHER PUBLICATIONS

Migoya, "Dollars & Sense Reports on Consumer Affairs Drive Less, Get Cheaper Premiums," Jun. 22, 2008, Denver Post, p. K.1.*
Van Der Meer, "Driving Less Will Cut Insurance Premium: Your Rate No Longer Figured by Zip Code," Jul. 19, 2006, Knight Ridder Tribune Business News, p. 1.*
Geico, "Auto Insurance Coverages Explained", http://www.geico.com/getaquote/auto/coverages-explained/, Aug. 26, 2008, 2 pages.
"U.S. Appl. No. 12/256,604, Non Final Office Action mailed Nov. 16, 2010", 9 pgs.
U.S. Appl. No. 12/256,596, Non Final Office Action mailed May 31, 2011, 14 pgs.
U.S. Appl. No. 12/256,604, Non Final Office Action mailed May 11, 2011, 9 pgs.
"OnStar/GMAC Insurance Pay-As-You-Go Insurance: "The Low-Mileage Discount" Insurance Discount Helps Onstar Users Drive Less, Save More" [online] [retrieved on Apr. 19, 2011]. Retrieved from the Internet: <URL: http://liveweb.web.archive.org/http://lowmileagediscount.com/what-is-payg/lmd-defined.asp>, 2 pgs.
Anonymous, "Video: GMAC Insurance Reveals Ways for Drivers to Cut Coasts on the Road; Insurer Provides Tips to Reduce Transportation Costs and Offers Low-Mileage Discount", PR Newswire, (Jul. 1, 2008).

* cited by examiner

*Primary Examiner* — James Kramer
*Assistant Examiner* — Samica L Norman
(74) *Attorney, Agent, or Firm* — Schwegman, Lundberg & Woessner, P.A.

(57) ABSTRACT

A user may be identified and authenticated to an institution system and may adjust the annual miles driven estimate for their vehicle. The annual miles driven estimate is used in the determination of the premium for the vehicle insurance for the vehicle. The premium for the vehicle insurance may be revised based on the adjustment by the user to the annual miles driven estimate. In an implementation, the user may reduce the annual miles driven estimate to zero to indicate that they are not driving the vehicle. The user may keep some elements of the vehicle insurance coverage and the vehicle insurance policy may remain active although the annual miles driven estimate is zero.

21 Claims, 5 Drawing Sheets

FIG. 3      300

SYSTEMS AND METHODS FOR SELF-SERVICE VEHICLE RISK ADJUSTMENT

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/256,596, and U.S. patent application Ser. No. 12/256,604, each filed on even date and each entitled "Systems And Methods For Self-Service Vehicle Risk Adjustment."

BACKGROUND

Insurance is a form of risk management primarily used to hedge against the risk of a contingent loss, and may be defined as the equitable transfer of the risk of a loss, from one entity to another, in exchange for a premium. An insurer is a company that sells insurance. An insurance rate is a factor used to determine the amount, called the premium, to be charged for a certain amount of insurance coverage.

Vehicle insurance is insurance purchased for cars, trucks, and other vehicles. It may provide protection against losses incurred as a result of traffic accidents, fire, theft or attempted theft, vandalism, weather, etc., and against liability that could be incurred in an accident. Vehicle insurance may cover the insured party, the insured vehicle, and third party vehicles and people.

Estimated miles driven on the vehicle, such as annual miles driven, is a factor that is used to determine the premium for vehicle insurance. It is difficult to adjust the premium when the annual miles driven changes abruptly or significantly, such as when a user alters their driving habits because of the price of gasoline, the fuel efficiency of their vehicle, a change in employment, etc.

SUMMARY

A user may be identified and authenticated to an institution system and may adjust the annual miles driven estimate for their vehicle. The annual miles driven estimate is used in the determination of a premium for vehicle insurance for the vehicle. The premium for the vehicle insurance may be revised based on the adjustment by the user to the annual miles driven estimate.

In an implementation, the user may reduce the annual miles driven estimate to zero to indicate that they are not driving the vehicle. Although the user may reduce the annual miles driven estimate to zero, the user may keep some elements of the vehicle insurance coverage. The vehicle insurance policy may remain active although the annual miles driven estimate is zero.

In an implementation, the user may adjust the annual miles driven estimate to one of a plurality of tiers, where each tier is associated with a different range or maximum number of miles. The premium for the vehicle insurance may be revised based on a tier selected by the user.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
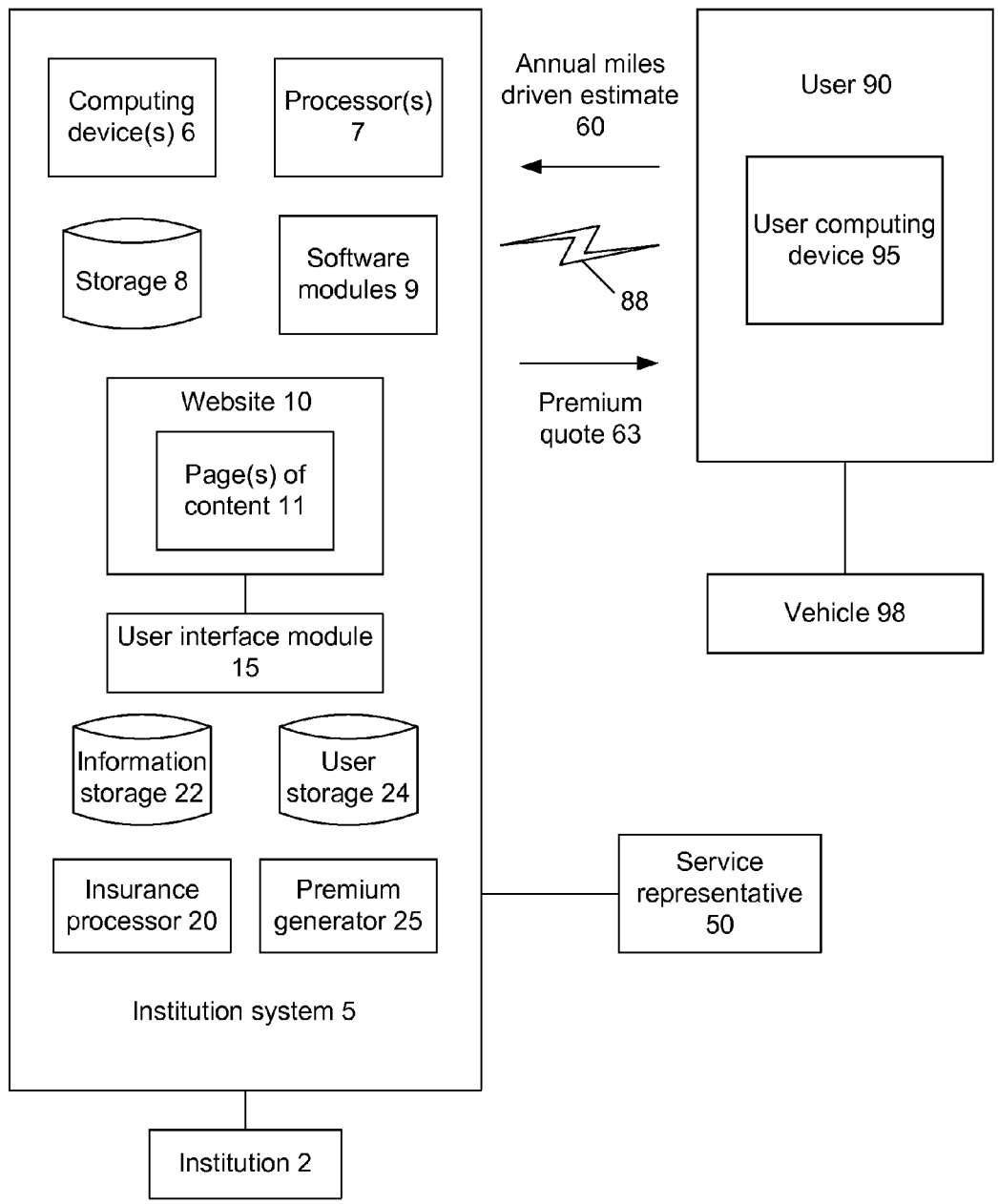
FIG. 1 is a block diagram of an implementation of a system that may be used to provide self-service vehicle risk adjustment.

FIG. 1 is a block diagram of an implementation of a system that may be used to provide self-service vehicle risk adjustment. An institution system 5 may be associated with an institution 2 which may be any type of entity capable of providing insurance services. For example, the institution 2 may be any type of insurance company, financial services company, etc.

A user 90 and an associated user computing device 95 are shown. The user 90 may be an individual who owns an insurance product (also may be referred to herein as a policy) or other account that may be provided by or held by the institution 2 associated with the institution system 5. The user 90 may insure a vehicle 98 with the institution system 5, e.g., via a vehicle insurance policy. For purposes of clarity and simplicity, an applicant for an insurance policy or a current holder of an insurance policy may be referred to herein as a "user." Thus, any reference to a user herein also includes any type of applicant, institution member or prospective member, or the like.

A vehicle insurance policy for the vehicle 98 may provide for any type of well known coverage, such as liability, collision, comprehensive, etc. For example, the user 90 may choose coverage on items such as bodily injury, property damage, uninsured/underinsured motorists bodily injury, uninsured/underinsured motorists property damage, etc.

The institution system 5 may include an insurance processor 20 that may process and maintain a vehicle insurance policy for the vehicle 98 of the user 90. The insurance processor 20 may retrieve information from storage, such as information storage 22 and user storage 24, and use the information in processing and maintaining a vehicle insurance policy. The insurance processor 20 may receive and process a request from the user 90 for information pertaining to the vehicle insurance policy of the user 90. The insurance processor 20 may send a request to the user 90 requesting instructions regarding insuring the vehicle 98. The insurance processor 20 may receive instructions from the user 90 and act on the instructions accordingly.

In an implementation, the insurance processor 20 may generate a representation, such as a graphical representation, or information for a representation, of coverage information of the vehicle insurance policy that is provided to the user 90, e.g., via the user computing device 95. A representation, such as a graphical representation, of a user's insurance policy coverage may be provided to a user. In an implementation, among other coverage elements, the provided representation may illustrate an annual miles driven estimate, for example.

The representation of coverage information may be provided via a website 10 to the user computing device 95 associated with a user 90. In an implementation, instead of hosting the website 10, the institution system 5 may comprise a conventional application server hosting a proprietary online service accessible only by a private network. In any event, the institution system 5 may have appropriate security mechanisms in place to prevent unauthorized third parties from intercepting the user's information.

A premium generator 25 may generate a premium quote 63 for a vehicle insurance policy. An estimate of the miles driven on the vehicle, such as annual miles driven estimate, is a factor that is used to determine the premium for vehicle insurance. The premium generator 25 may receive an annual miles driven estimate 60 from the user 90 (e.g., directly, from storage, or via the insurance processor 20) and determine a premium for the vehicle insurance policy based on the annual miles driven estimate 60 as well as other factors. The premium quote 63, pertaining to the determined premium, may be provided to the user 90. Although example described herein may refer to an annual miles driven estimate, it is contemplated that the time period for the miles driven estimate is not limited to a year, and any time period for the miles driven estimate may be used.

The premium generator 25 may use any techniques(s) for generating a premium quote for insuring the vehicle 98. The premium generator 25 may receive and use information from the insurance processor 20 as well as from information storage 22 and user storage 24, for example. Additionally, the premium generator 25 may request and receive information pertaining to the vehicle 98 from the user 90. This information may be used in generation of the premium quote 63. After retrieving or otherwise receiving the data from the various sources, the premium generator 25 may use tools, applications, and aggregators, for example, to generate the premium quote 63 for insurance of the vehicle 98. The premium quote may be provided to the user 90, who may accept the premium quote.

Information storage 22 may contain information pertaining to users who have insurance policies or other types of products or accounts hosted by the institution system 5, data related to the policies, products and accounts, and population and demographic data pertaining to the users, for example. Information storage 22 may include data that may be used in the generation of a representation of coverage information. User storage 24 may contain information directed to users, such as name, address, marital status, account information, etc., for example.

The insurance processor 20 and the premium generator 25 have access to data, files, and documents pertaining to the user 90 and the vehicle 98 as well as any other data, files, and documents that are currently stored by the institution system 5 as well as external data, files, and documents and that may be useful in generating premium quotes for insuring the vehicle 98 and writing insurance policies for the vehicle 98. Data pertaining to the user 90, the vehicle 98, the user's insurance policies, and/or the user accounts may be retrieved from information storage 22 and/or user storage 24, in an implementation. The retrieved data may be stored centrally, perhaps in storage 8. Other information may be provided to the institution system from the user 90.

Information storage 22 and/or user storage 24 may contain data, metadata, email, files, and/or documents that the institution system 5 maintains pertaining to the user 90, such as personal data such as name, physical address, email address, etc., insurance policy data such as premiums and coverage amounts, as well as other account information. The institution system 5 may access this information when generating premium quotes or issuing insurance policies, for example.

The user 90 may provide data to the institution system 5 via the user computing device 95. The user computing device may be a handheld computing device such as a personal digital assistant (PDA) or a mobile phone, for example, or any type of personal computer (PC). The user computing device 95 and the institution system 5 may be connected over a network 88. It is contemplated that the network 88 may be any type of private or public communication network such as, for example, an intranet, Internet, local area network (LAN), wide area network (WAN), wireless fidelity (WiFi) network, cellular connection, plain old telephone service (POTS), a public switched telephone network (PSTN), a cellular network, a voice over Internet protocol (VoIP) network, and the like. An example user computing device is described with respect to FIG. 5. The user 90 may also communicate with the institution system 5 by phone, email, instant messaging, facsimile, mail, and the like.

A service representative 50 associated with the institution system 5 may confer with the user 90 about coverage information. Such a conference may be via a chat session or a telephone, for example.

In an implementation, a user interface module 15 may receive content from the insurance processor 20 and/or the premium generator 25 and format one or more pages of content 11 as a unified graphical presentation that may be provided to the user computing device 95. The page(s) of content 11 may be directed to a graphical representation of coverage information and may be provided to the user computing device 95 via the website 10. It will be appreciated that, in an embodiment, the service representative 50 may access the user interface module 15, or the underlying representation of coverage information, to assist the user 90.

In an implementation, a graphical representation may be provided that displays a user's insurance coverage. Via the graphical representation, the user may request information about various aspects of the coverage and/or may request to chat or speak with a service representative 50. The user 90 may also provide an annual miles driven estimate 60 via the graphical representation and may be provided with a revised premium amount. The user 90 may select this coverage to be implemented and the user's vehicle insurance policy may be appropriately revised.

When the user 90 accesses the website 10, using a web browser on the user computing device 95 for example, the user 90 may be presented with information pertaining to a vehicle insurance policy that they are considering purchasing or a vehicle insurance policy that they already have purchased, via the page(s) of content 11. The information may be in a graphical representation form, for example. The user 90 may enter information into the graphical representation via a web browser on the user computing device 95. In this manner, for example, the user 90 may provide an annual miles driven estimate 60 to the institution system 5. As described further herein, in an implementation, the user 90 may modify their vehicle insurance policy by providing an adjustment to the annual miles driven estimate that is used in the determination of the premium for their vehicle insurance policy.

The user 90 may be identified and authenticated to an institution system 5 (e.g., via website, phone, mail, etc.) and may adjust the annual miles driven estimate for the vehicle 98. The annual miles driven estimate 60 is a vehicle risk factor used by the institution system 5 in the determination of the premium for the vehicle insurance for the vehicle. Such self-service vehicle risk adjustment allows the user 90 to adjust the annual miles driven estimate at any time while a vehicle insurance policy is in effect. The premium for the vehicle insurance may be revised based on the adjustment by the user to the annual miles driven estimate. The user 90 may pay the revised premium on a going forward basis. In this manner, the premium is dynamic, and is not limited to annual or semi-annual pricing, for example.

Thus, the premium may be changed when the annual miles driven estimate is changed. In an implementation, the number of times a user may change the annual miles driven estimate may be limited during a particular time period (e.g., twice each six month period, once per month, etc.).

In an implementation, a user may change the annual miles driven estimate to zero, thereby agreeing to not drive their vehicle (also referred to herein as "mothball"-ing the vehicle). In this manner, the user and the vehicle may keep a vehicle insurance policy on the vehicle, but with a premium priced to reflect the mothballing of the vehicle. It is contemplated that a miles driven estimate other than zero may be used to indicate a mothballing of a vehicle. For example, in an implementation, a miles driven estimate below a predetermined number such as 50 miles, 100 miles, or 200 miles, etc. may be used to indicate a mothballing of a vehicle.

The content provided to the user 90 may be personalized to the user 90, using information retrieved from the user storage 24, for example. Personalization may include presentation of the page(s) of content 11 and/or functionality of the page(s) of content 11. For example, a graphical representation displayed on the page(s) of content 11 may be pre-filled with some information pertaining to the user, such as name, address, policy number, etc. In an implementation, personalization may be directed to a vehicle insurance policy, and may provide specific information on the user's vehicle 98 or aspects of the user's coverage. Personalization is not limited to vehicle insurance policies and may be directed to any type of data, information, product, service, advertisement, etc.

A user access system may be communicatively coupled to the insurance processor 20 and/or the premium generator 25 and may be configured to send machine-readable instructions to the insurance processor 20 and/or the premium generator 25. As mentioned above, the institution system 5 may provide a unified graphical presentation output. The unified graphical presentation may be transmitted to the user access system. In an implementation, the unified graphical presentation may be combined with other materials and transmitted to the user 90. In an implementation, the unified graphical presentation is received by the user access system and transmitted directly to the user 90 without the inclusion of any other materials.

The user access system may be implemented as a web server in an implementation. The user access system, through the use of any suitable interactive web technology, provides an interactive experience to the user 90 through which access to vehicle insurance data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 5 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 5 may comprise one or more computing devices 6. The user computing device 95 may allow the user 90 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user and/or insurance policies may be stored in storage 8 or other storage, for example.

Example software modules may include modules for sending and receiving information between the institution system 5 and the user 90, requesting and retrieving information from storage 8, information storage 22, and user storage 24, providing coverage information to the user 90, generating a premium quote 63 for the vehicle 98 based on the annual miles driven estimate 60 and sending the premium quote 63 to the user 90, issuing an insurance policy or other coverage for the vehicle 98, generating web page content for display, and receiving instructions from the user 90, for example. While specific functionality is described herein as occurring with respect to specific modules, the functionality may likewise be performed by more, fewer, or other modules. An example computing device and its components are described in more detail with respect to FIG. 5.

Figure 2:
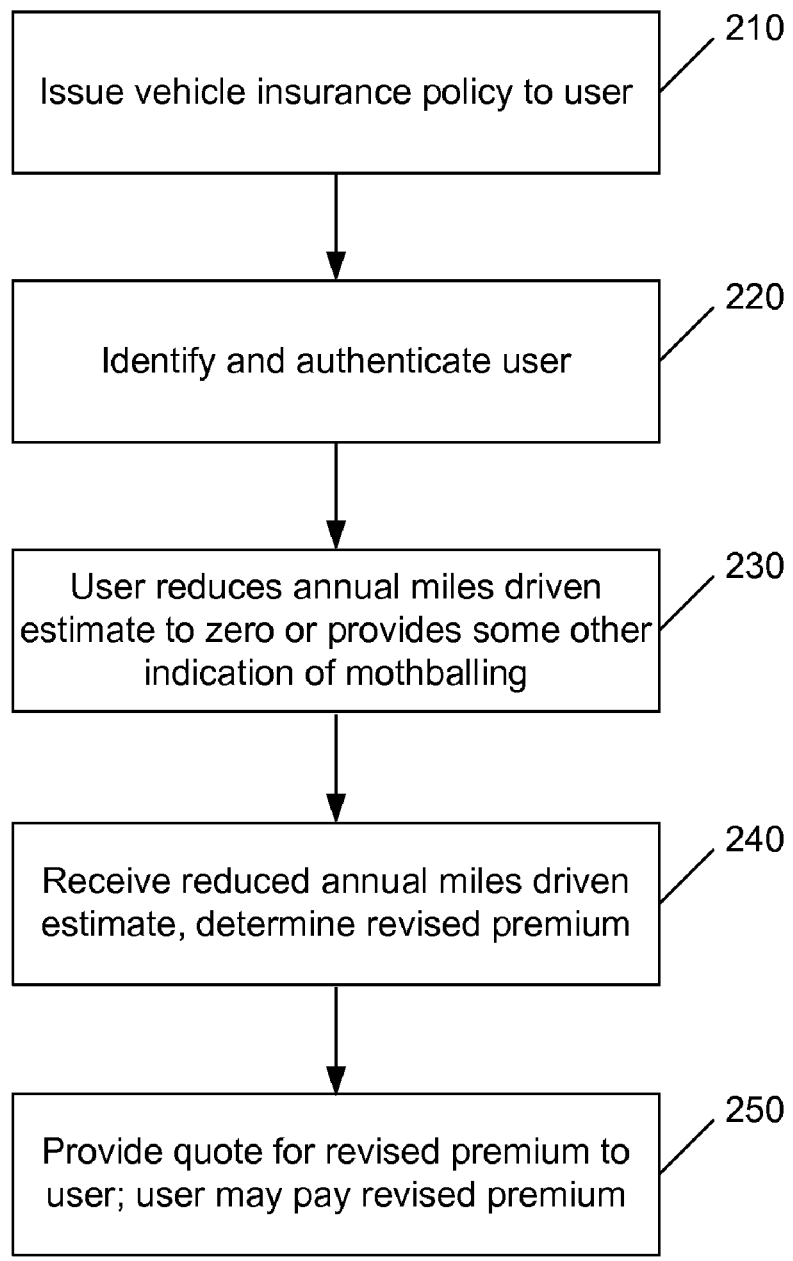
FIG. 2 is an operational flow of an implementation of a method that may be used to provide self-service vehicle risk adjustment.

FIG. 2 is an operational flow of an implementation of a method 200 that may be used to provide self-service vehicle risk adjustment. At 210, a vehicle insurance policy may be issued to a user, e.g., by an institution. The vehicle insurance policy may have a related premium that may be paid by the user periodically, such as weekly, bi-weekly, monthly, etc. The premium may be based, at least in part, on an annual miles driven estimate provided by the user.

At some point, the user may perform a self-service vehicle risk adjustment to the vehicle insurance policy. At 220, the user may be identified and authenticated by the institution using any known technique(s). The user may identified and authenticated via a website of an institution system affiliated with the institution or by any other electronic or physical techniques such as by telephone, email, mail, text messaging, instant messaging, communicating with a service representative, etc.

In an implementation, information pertaining to a vehicle insurance policy of the user may be retrieved and presented to the user. The information may include an annual miles driven estimate. At 230, the user may reduce the annual miles driven estimate to zero or some other indication established by the institution to indicate that the user is agreeing to discontinue driving the vehicle (i.e., no longer drive the vehicle). In this manner, the user may be considered to be mothballing the vehicle or otherwise agreeing not to drive the vehicle. The user may provide an annual miles driven estimate to the institution (e.g., to the institution system) by any input technique(s) such as via a selection of one or more drop down menus, one or more buttons, icons, or other selectable indicators, by direct entry, and/or by response to a prompt, for example. The user may provide an annual miles driven estimate via a website, text message, instant message, phone, facsimile, email, mail, and the like.

Although the user may reduce the annual miles driven estimate to zero or provide some other indication of mothballing, in an implementation, a low mileage allowance may be provided to the user. The low mileage allowance may allow the vehicle to be driven a predetermined number of miles greater than zero miles. In this manner, the user may be permitted to accrue a predetermined amount of mileage to attend to such items as routine service and maintenance, emergency usage, etc.

In an implementation, the user may keep some elements of the vehicle insurance coverage, such as liability, collision, comprehensive, bodily injury, property damage, rental reimbursement, towing and labor, uninsured/underinsured motorists bodily injury, or uninsured/underinsured motorists property damage, for example. The vehicle insurance policy may remain active although the annual miles driven estimate has been reduced to zero or the user has provided some other indication or level that indicates the user is mothballing the vehicle (i.e., agreeing to no longer drive the vehicle).

At 240, the institution may receive the reduced annual miles driven estimate and may determine a revised premium based on the reduced annual miles driven estimate. The premium for the vehicle insurance policy, and its driving related coverage(s), may be substantially reduced. The vehicle insurance policy may have a term and an expiration date, and the revised premium may be for the remainder of the term of the vehicle insurance policy prior to the expiration date.

At 250, a quote for the revised premium may be provided to the user. The user may pay the revised premium, e.g., in accordance with a payment plan such as weekly, bi-weekly, monthly, bi-monthly, etc. Payments may be made for the remainder of the term of the vehicle insurance policy.

At some point, the user may decide to drive the vehicle again and may adjust the annual miles driven estimate accordingly. The premium may be revised based on the adjusted annual miles driven estimate.

Figure 3:
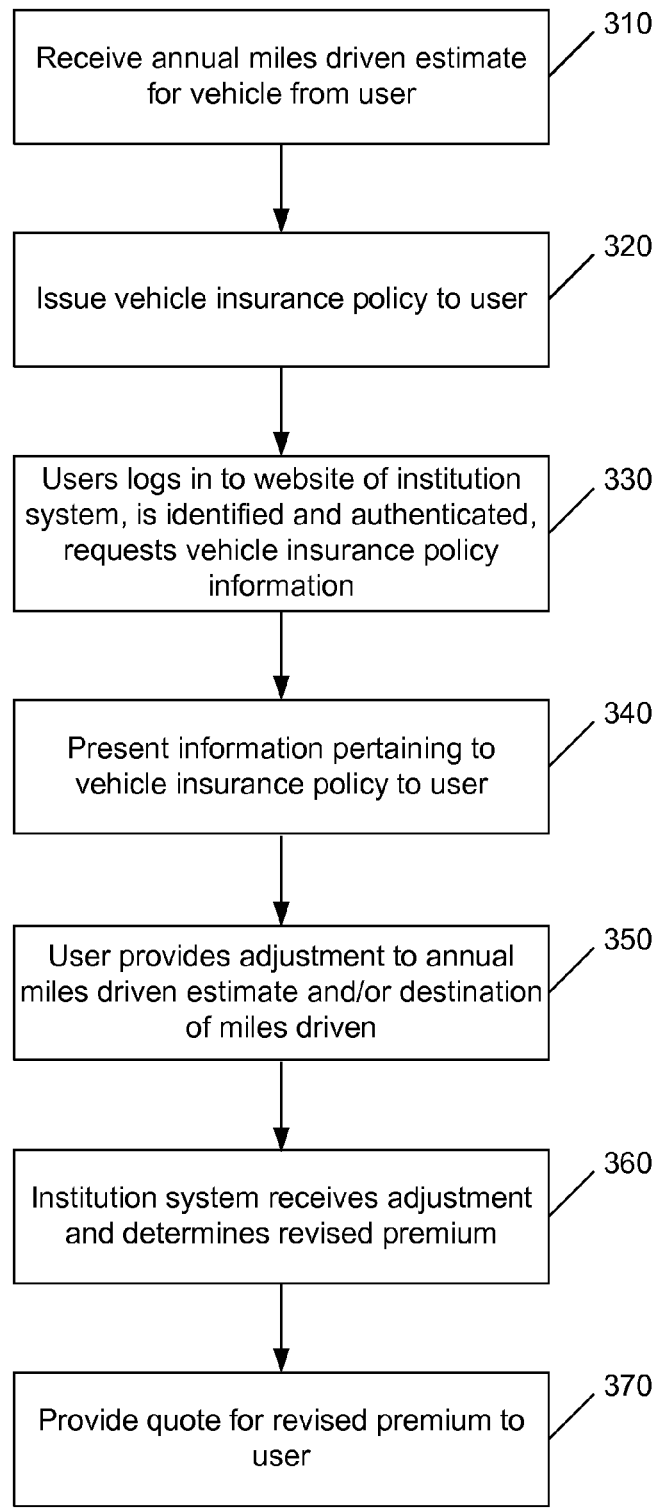
FIG. 3 is an operational flow of another implementation of a method that may be used to provide self-service vehicle risk adjustment.

FIG. 3 is an operational flow of another implementation of a method 300 that may be used to provide self-service vehicle risk adjustment. At 310, an annual miles driven estimate for a vehicle may be provided by a user to an institution. At 320, a vehicle insurance policy may be issued to the user by the institution. The premium for the vehicle insurance policy may be based, at least in part, on the annual miles driven estimate provided by the user.

At some point, the user may want to adjust the annual miles driven estimate, which in turn may lead to an adjusted premium for the vehicle insurance policy. At 330, the user may contact the institution, e.g., by logging in to a website of the institution system. The institution system may identify and authenticate the user. In an implementation, a user may log in to a website associated with the institution system, may be identified and authenticated using any known techniques, and may request vehicle insurance policy information. Instead of communicating with the institution via a website, the user may communicate with the institution by any electronic or physical techniques such as by telephone, email, mail, text messaging, instant messaging, communicating with a service representative, etc.

At 340, the institution system may present the user with information pertaining to the vehicle insurance policy. Information pertaining to the user and the user's policy and coverage information may be retrieved from storage. The information may include the current annual miles driven estimate that the current premium is based on. The user may be provided with a graphical representation of their insurance coverage. The graphical representation may be provided to the user via a computing device.

The user may view the graphical representation. The user may request or select information related to an aspect of the graphical representation, such as information directed to one of the coverage areas or information directed to a premium. The user may make a selection by selecting a link displayed on the graphical representation, highlighting an area of the graphical representation, and/or clicking on an area of the graphical representation, for example. The information that the user may select may then be provided to the user via a website, email, and/or a representative of the institution, for example.

At 350, the user may provide an adjustment to the annual miles driven estimate. The adjustment may comprise a reduction or an increase in the annual miles driven estimate. In an implementation, the user may change the destination of the miles driven, such as to work or recreational. The destination of the miles driven may affect the premium of the vehicle insurance policy. The adjustment to the annual miles driven estimate (and the destination of the miles driven) may be provided by the user to the institution system via the website, email, telephone, facsimile, mail, text messaging, instant messaging, communicating with a service representative, etc.

The institution system may receive the adjustment at 360, and may determine a revised premium based on the adjustment to the annual miles driven estimate. Additionally or alternatively, the revised premium may be based on the changed destination. At 370, a quote for the revised premium may be provided to the user, and the user may be charged the new premium.

Premium information may also be provided to the user as the user adjusts the annual miles driven estimate. In an implementation, as the user changes the annual miles driven estimate on a website for example, the associated premium amount may change, and the user may see how their premium will change as they consider different annual miles driven estimates. In an implementation, if the user likes the adjustment to the annual miles driven estimate and its associated premium, the user can click a commit button or other selector and put the policy changes into effect.

Figure 4:
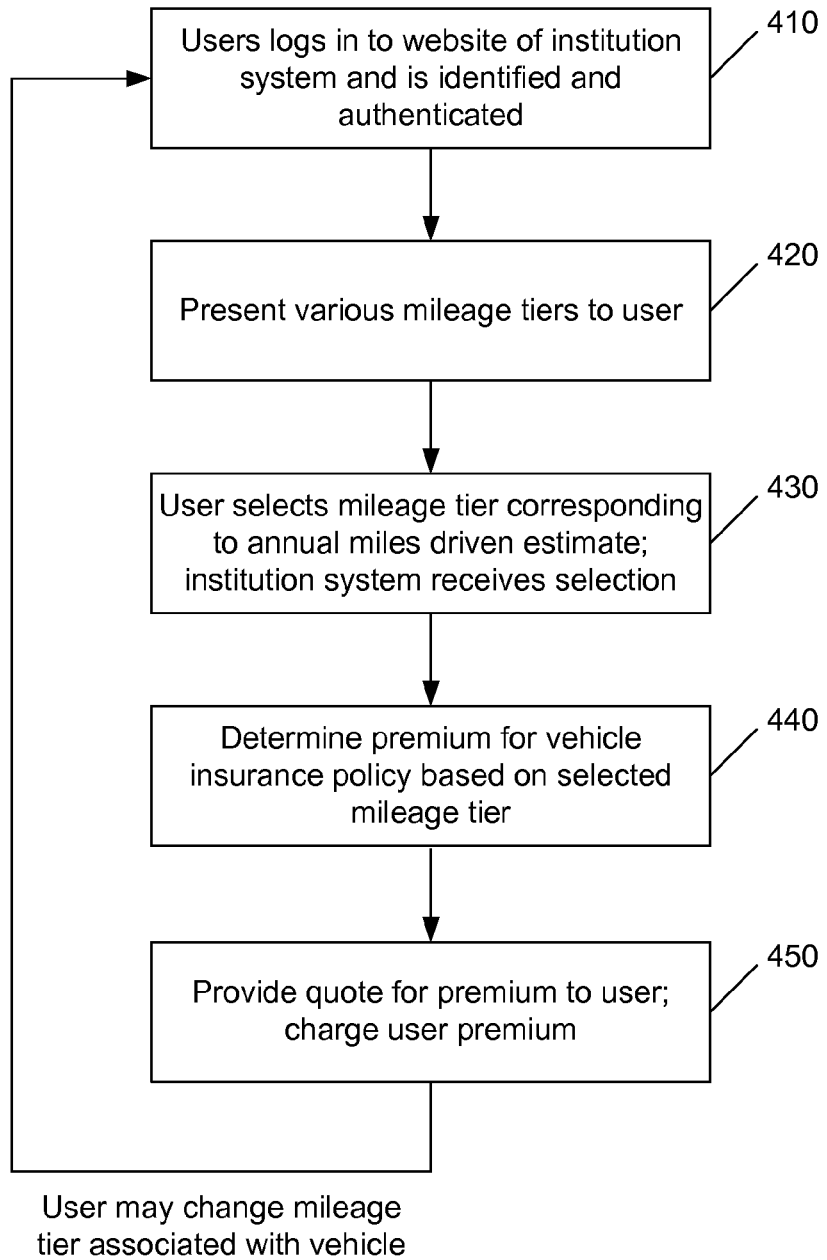
FIG. 4 is an operational flow of another implementation of a method that may be used to provide self-service vehicle risk adjustment.

FIG. 4 is an operational flow of another implementation of a method 400 that may be used to provide self-service vehicle risk adjustment. At 410, the user may be identified and authenticated by the institution, e.g., via a website of the institution system or any other known technique(s).

At 420, the institution system may present various mileage tiers to the user. Each mileage tier may correspond to a maximum number of miles that a user may drive their vehicle in a particular time period, such as annually, semi-annually, etc. For example, a mothball tier may correspond to zero miles driven per year. One or more low mileage tiers may be provided, such as a maintenance tier that corresponds to a maximum of 200 miles driven per year, and an incidental use tier that corresponds to a maximum of 500 miles driven per year, for example. The examples described herein are not intended to be limiting, and it is contemplated that any number of mileage tiers may be provided with any mileage amounts, ranges, and/or maximums.

At 430, the user may select the mileage tier that corresponds to their annual miles driven estimate and the selection may be received by the institution system. The user may select the tier via a website associated with the institution system or via a graphical representation provided to the user, for example. In an implementation, the mileage tiers may be provided in a drop down menu that may be selected by a user. However, any technique(s) for providing a mileage tier and/or selecting a mileage tier may be used.

At 440, the institution system may determine a premium based on the mileage tier selected by the user that corresponds to the user's annual miles driven estimate. At 450, a quote for the premium may be provided to the user, and the user may be charged the premium.

At some point, the user may wish to adjust the mileage tier associated with their vehicle, and processing may continue at 410. The adjusted mileage tier selected by the user may be used by the institution system to determine a revised premium that may be charged to the user for the vehicle insurance policy.

Figure 5:
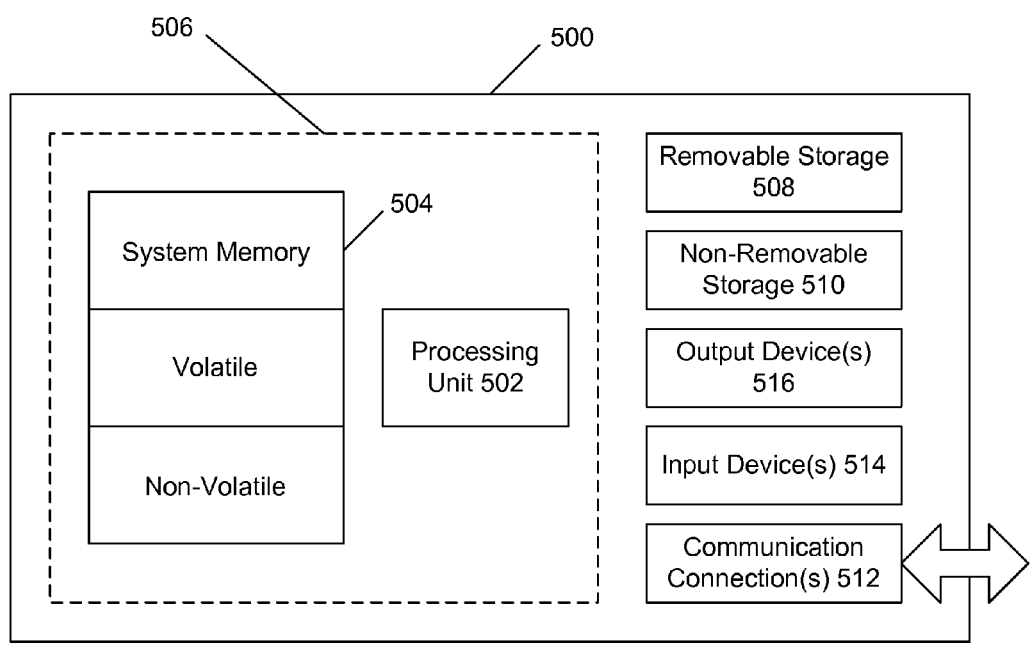
FIG. 5 is a block diagram of an example computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and system memory 504. Depending on the exact configuration and type of computing device, system memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features and/or functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer-readable media. Computer-readable media can be any available media that can be accessed by computing device 500 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 504, removable storage 508, and non-removable storage 510 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may also contain communication connection(s) 512 that allow the computing device 500 to communicate with other devices. Communication connection(s) 512 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices interconnected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A self-service vehicle risk adjustment method, comprising:
   issuing a vehicle insurance policy having a premium based on a miles driven estimate of a vehicle of a user;
   determining, at a processing device, whether the user is allowed to change the miles driven estimate based on a number of times the user can change the miles driven estimate in a time period; and
   when the user is allowed to change the miles driven estimate:
      receiving, at the processing device, an adjustment to the miles driven estimate; and
      determining, at the processing device, a revised premium based on the adjustment.

2. The method of claim 1, wherein the adjustment comprises an increase to the miles driven estimate.

3. The method of claim 1, wherein the adjustment comprises a decrease to the miles driven estimate.

4. The method of claim 3, wherein the decrease is to zero miles, further comprising providing the vehicle insurance policy with a predetermined mileage allowance greater than zero miles.

5. The method of claim 1, wherein the adjustment comprises a change in a destination of miles driven.

6. The method of claim 1, wherein the miles driven estimate is received from the user.

7. The method of claim 1, wherein the adjustment to the miles driven estimate is electronically received from the user via a website.

8. A non-transitory computer-readable medium comprising computer-readable instructions for self-service vehicle risk adjustment, said computer-readable instructions comprising instructions that:
   issue a vehicle insurance policy having a premium based on a miles driven estimate of a vehicle of a user;
   determine whether the user is allowed to change the miles driven estimate based on a number of times the user can change the miles driven estimate in a time period; and
   when the user is allowed to change the miles driven estimate:
      receive an adjustment to the miles driven estimate; and
      determine a revised premium based on the adjustment.

9. The non-transitory computer-readable medium of claim 8, wherein the adjustment comprises an increase to the miles driven estimate.

10. The non-transitory computer-readable medium of claim 8, wherein the adjustment comprises a decrease to the miles driven estimate.

11. The non-transitory computer-readable medium of claim 10, wherein the decrease is to zero miles, further comprising instructions that provide the vehicle insurance policy with a predetermined mileage allowance greater than zero miles.

12. The non-transitory computer-readable medium of claim 8, wherein the adjustment comprises a change in a destination of miles driven.

13. The non-transitory computer-readable medium of claim 8, wherein the miles driven estimate is received from the user.

14. The non-transitory computer-readable medium of claim 8, wherein the adjustment to the miles driven estimate is electronically received from the user via a website.

15. A self-service vehicle risk adjustment system, comprising:
   at least one subsystem that issues a vehicle insurance policy having a premium based on a miles driven estimate of a vehicle of a user;
   at least one subsystem that determines whether the user is allowed to change the miles driven estimate based on a number of times the user can change the miles driven estimate in a time period;
   at least one subsystem that receives an adjustment to the miles driven estimate when the user is allowed to change the miles driven estimate; and
   at least one subsystem that determines a revised premium based on the adjustment when the user is allowed to change the miles driven estimate.

16. The system of claim 15, wherein the adjustment comprises an increase to the miles driven estimate.

17. The system of claim 15, wherein the adjustment comprises a decrease to the miles driven estimate.

18. The system of claim 17, wherein the decrease is to zero miles, further comprising at least one subsystem that provides the vehicle insurance policy with a predetermined mileage allowance greater than zero miles.

19. The system of claim 15, wherein the adjustment comprises a change in a destination of miles driven.

20. The system of claim 15, wherein the miles driven estimate is received from the user.

21. The system of claim 15, wherein the adjustment to the miles driven estimate is electronically received from the user via a website.

* * * * *

UNITED STATES PATENT AND TRADEMARK OFFICE
CERTIFICATE OF CORRECTION

| | | |
|---|---|---|
| PATENT NO. | : 8,027,853 B1 | Page 1 of 1 |
| APPLICATION NO. | : 12/256600 | |
| DATED | : September 27, 2011 | |
| INVENTOR(S) | : Joseph A. Kazenas | |

It is certified that error appears in the above-identified patent and that said Letters Patent is hereby corrected as shown below:

On the face page, in field (73), in "Assignee", in column 1, line 1, delete "United States Automobile Associates" and insert -- United Services Automobile Association --, therefor.

On the face page, in field (56), under "Other Publications", in column 2, line 18, delete "Coasts" and insert -- Costs --, therefor.

Signed and Sealed this
Sixth Day of December, 2011

David J. Kappos
*Director of the United States Patent and Trademark Office*